(12) United States Patent
Suh (10) Patent No.: US 11,340,365 B2
(45) Date of Patent: May 24, 2022

(54) SWITCHABLE DISTRIBUTED ACOUSTIC SENSING SYSTEM FOR WELLBORE ENVIRONMENT

(71) Applicant: Halliburton Energy Services, Inc., Houston, TX (US)

(72) Inventor: Kwang Il Suh, Stevenson Ranch, CA (US)

(73) Assignee: Halliburton Energy Services, Inc., Houston, TX (US)

( * ) Notice: Subject to any disclaimer, the term of this patent is extended or adjusted under 35 U.S.C. 154(b) by 540 days.

(21) Appl. No.: 16/339,541

(22) PCT Filed: Nov. 17, 2016

(86) PCT No.: PCT/US2016/062419
§ 371 (c)(1),
(2) Date: Apr. 4, 2019

(87) PCT Pub. No.: WO2018/093365
PCT Pub. Date: May 24, 2018

(65) Prior Publication Data
US 2019/0235104 A1    Aug. 1, 2019

(51) Int. Cl.
*G01V 1/00*    (2006.01)
*G01V 1/22*    (2006.01)
*G01V 1/20*    (2006.01)
*G01V 1/42*    (2006.01)
(Continued)

(52) U.S. Cl.
CPC ......... *G01V 1/226* (2013.01); *G01D 5/35316* (2013.01); *G01H 9/004* (2013.01); *G01V 1/208* (2013.01); *G01V 1/42* (2013.01); *G01V 2210/123* (2013.01);
(Continued)

(58) Field of Classification Search
USPC .......................................................... 367/76
See application file for complete search history.

(56) References Cited

U.S. PATENT DOCUMENTS

| 5,137,351 A | 8/1992 | So |
| 5,194,847 A | 3/1993 | Taylor et al. |
| 7,030,971 B1 | 4/2006 | Payton |
| (Continued) | | |

FOREIGN PATENT DOCUMENTS

GB    2473371    6/2012

OTHER PUBLICATIONS

International Patent Application No. PCT/US2016/062419, "International Search Report and Written Opinion", dated Aug. 17, 2017, 19 pages.

*Primary Examiner* — James R Hulka
(74) *Attorney, Agent, or Firm* — Kilpatrick Townsend & Stockton LLP (57) ABSTRACT

An interrogation system includes a light signal switch and a reflection signal switch. The light signal switch may be communicatively coupled to an optical light source. The light signal switch may route a light signal generated by the light source downhole in a wellbore through a single-mode optical fiber cable or a multi-mode optical fiber cable. The reflection signal switch may be communicatively coupled to the single-mode optical fiber cable and the multi-mode optical fiber cable. The reflection signal switch may route a reflection of the light signal from the signal-mode optical fiber cable or the multi-mode optical fiber cable to an optical detector.

17 Claims, 5 Drawing Sheets

(51) Int. Cl.
  *G01H 9/00* (2006.01)
  *G01D 5/353* (2006.01)

(52) U.S. Cl.
  CPC ........... *G01V 2210/1234* (2013.01); *G01V 2210/1299* (2013.01); *G01V 2210/1429* (2013.01)

(56) References Cited

U.S. PATENT DOCUMENTS

| | | | | |
|---|---|---|---|---|
| 7,173,690 B2* | 2/2007 | Haran | ............... | G01M 3/18 356/73.1 |
| 7,474,851 B2 | 1/2009 | Inman et al. | | |
| 7,859,654 B2* | 12/2010 | Hartog | ............... | G01M 11/3127 356/73.1 |
| 7,872,736 B2 | 1/2011 | Rogers et al. | | |
| 7,946,341 B2 | 5/2011 | Hartog et al. | | |
| 8,493,556 B2* | 7/2013 | Li | ............... | G01K 11/32 356/73.1 |
| 8,520,197 B2* | 8/2013 | Handerek | ............... | G01V 1/40 356/73.1 |
| 9,140,582 B2* | 9/2015 | Farhadiroushan | ............... | G01D 5/35335 |
| 9,429,466 B2* | 8/2016 | Barfoot | ............... | G01V 1/226 |
| 9,541,425 B2* | 1/2017 | Farhadiroushan | ............... | G01D 5/35358 |
| 2006/0066839 A1* | 3/2006 | Payton | ............... | G01L 11/025 356/73.1 |
| 2006/0067688 A1* | 3/2006 | Inman | ............... | H04L 1/205 398/45 |
| 2008/0297772 A1* | 12/2008 | Rogers | ............... | G01M 11/3118 356/73.1 |
| 2009/0114386 A1* | 5/2009 | Hartog | ............... | E21B 43/26 166/250.08 |
| 2012/0127459 A1 | 5/2012 | Handerek | | |
| 2012/0274927 A1 | 11/2012 | Li | | |
| 2015/0114127 A1 | 4/2015 | Barfoot et al. | | |
| 2017/0205253 A1 | 7/2017 | Handerek | | |
| 2017/0259513 A1 | 9/2017 | Xia et al. | | |
| 2017/0260848 A1 | 9/2017 | Xia et al. | | |
| 2017/0260874 A1 | 9/2017 | Yoshimine et al. | | |

* cited by examiner

SWITCHABLE DISTRIBUTED ACOUSTIC SENSING SYSTEM FOR WELLBORE ENVIRONMENT

TECHNICAL FIELD

The present disclosure relates generally to distributed acoustic systems and, more particularly (although not exclusively), to distributed acoustic sensing systems that are switchable between single-mode and multi-mode optical fiber cables of a wellbore environment.

BACKGROUND

Distributed optical sensing technology may be suitable for various downhole applications ranging from temperature sensing to passive seismic monitoring. For example, a distributed acoustic sensing system may include an interrogation device positioned at a surface proximate to a wellbore and coupled to an optical fiber extending from the surface into the wellbore. A light source of the interrogation device may transmit a light signal downhole in the wellbore through the optical fiber to sensors positioned on the optical fiber. The sensors may transmit a reflection of the light signal back toward an optical detector that may be analyzed to determine a condition in the wellbore.

DETAILED DESCRIPTION

Certain aspects and examples of the present disclosure relate to a distributed acoustic sensing system architecture that includes single-mode optical fibers and multi-mode optical fibers connected to common light source. The single-mode optical fibers and the multi-mode optical fiber cable may be positioned in a wellbore and include one or more sensors that may be interrogated to determine conditions in the wellbore. The single-mode optical fibers may include one or more optical fibers that propagate, or carry, light in a direction that is parallel to the fiber (e.g., a traverse mode). The multi-mode optical fibers may include one or more optical fibers that propagate light in more than one direction. A switch can be positioned between the light source and the optical fibers to allow an operator to selectively switch the distributed acoustic sensing system between a single-mode operation and a multi-mode operation. In the single-mode operation, light signals generated by the light source are routed by the switch to the single-mode optical fibers to interrogate the sensors positioned on the single-mode optical fibers. Similarly, in the multi-mode operation, the light signals generated by the light source are routed by the switch to the multi-mode optical fibers to interrogate the sensors positioned on the multi-mode optical fibers.

In both the single-mode operation and the multi-mode operation, the sensors may generate a reflected light signal that is transmitted back toward the surface of the wellbore via the single-mode optical fibers or the multi-mode optical fibers, respectively. A second switch may be positioned at the output of the single-mode optical fiber and the multi-mode optical fibers to receive the reflected light signal from the single-mode optical fiber or the multi-mode optical fibers and route the reflected light signals to an optical detector of the distributed acoustic sensing system. The optical detector may analyze the reflected light signal to determine conditions of the wellbore (e.g., temperature, seismic displacement, etc.)

A distributed acoustic sensing system according to certain aspects of the present disclosure may allow a wellbore operator to tailor sensing operations in the wellbore to the mode best suited for the operation without requiring an installation or removal of system hardware. For example, single-mode operation may be better suited for interrogating sensors positioned deeper in the wellbore as the multi-mode optical fiber is subject to issues such as modal dispersion (e.g., distortion of the light signals) over longer lengths of fiber. Conversely, multi-mode operation may be better suited for shorter distances to interrogate sensors to the surface of the wellbore and may have higher transmission speeds for quicker measurements. Using systems according to certain aspects may allow an operator to select the mode of optical signal transmission simply and without requiring hardware changes.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

Figure 1:
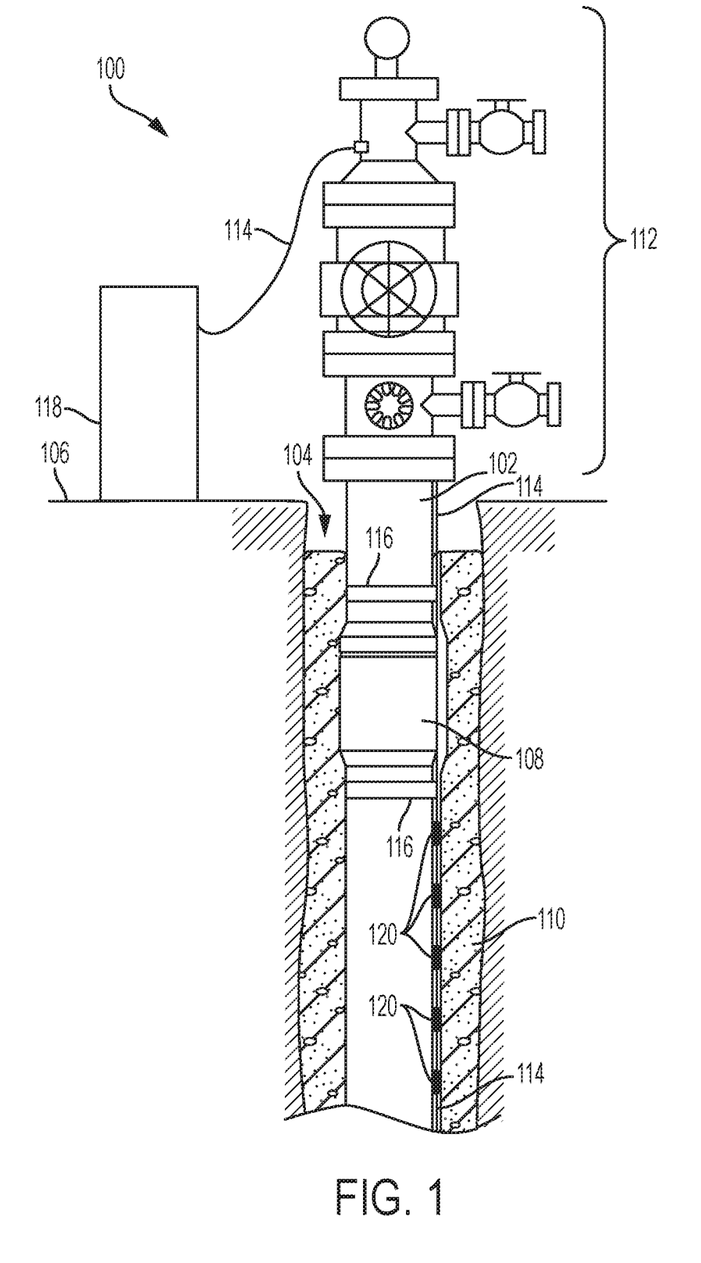
FIG. 1 is a cross-sectional schematic diagram depicting an example of a wellbore environment including a distributed acoustic sensing system according to one aspect of the present disclosure.

Various aspects of the present disclosure may be implemented in various environments. FIG. 1 illustrates a non-limiting example of a wellbore environment 100 that may include a distributed acoustic sensing system according to some aspects of the present disclosure. The wellbore environment 100 may include a casing string 102 positioned in a wellbore 104 that has been formed in a surface 106 of the earth. The wellbore environment 100 may have been constructed and completed in any suitable manner, such as by use of a drilling assembly having a drill bit for creating the wellbore 104. The casing string 102 may include tubular casing sections connected by end-to-end couplings 108. In some aspects, the casing string 102 may be made of a suitable material such as steel. Within the wellbore 104, cement 110 may be injected and allowed to set between an outer surface of the casing string 102 and an inner surface of the wellbore 104. At the surface 106 of the wellbore 104, a tree assembly may be joined to the casing string 102. The tree assembly 112 may include an assembly of valves, spools, fittings, etc. to direct and control the flow of fluid (e.g., oil, gas, water, etc.) into or out of the wellbore 104 within the casing string 102.

Optical fiber cables 114 may be routed through one or more ports in the tree assembly 112 and extend along an outer surface of the casing string 102. The optical fiber cables 114 include multiple cables. For example, the optical fiber cables 114 include one or more single-mode optical fiber cables and one or more multi-mode optical fiber cables. Each of the optical fiber cables 114 may include one or more optical sensors along the optical fiber cables 114. The sensors may be deployed in the wellbore 104 and used to sense and transmit measurements of downhole conditions in the wellbore environment 100 to the surface 106. The optical fiber cables 114 may be retained against the outer surface of the casing string 102 at intervals by coupling bands 116 that extend around the casing string 102. The optical fiber cables 114 may be retained by at least two of the coupling bands 116 installed on either side of the couplings 108.

The optical fiber cables 114 can be coupled to an interrogation subsystem 118 of a distributed acoustic sensing system. The interrogation subsystem 118 is positioned at the surface 106 of the wellbore 104. In some aspects, the interrogation subsystem 118 may be an opto-electronic unit that may include devices and components to interrogate sensors 120 coupled to the optical fiber cables 114. For example, the interrogation subsystem 118 may include a light source, such as a laser device, that can generate light signals to be transmitted through one or more of the optical fiber cables 114 to the sensors 120 in the wellbore 104. The interrogation subsystem 118 may also include a detector device to receive and perform interferometric measurements of reflected light from the sensors coupled to the optical fiber cables 114.

Figure 2:
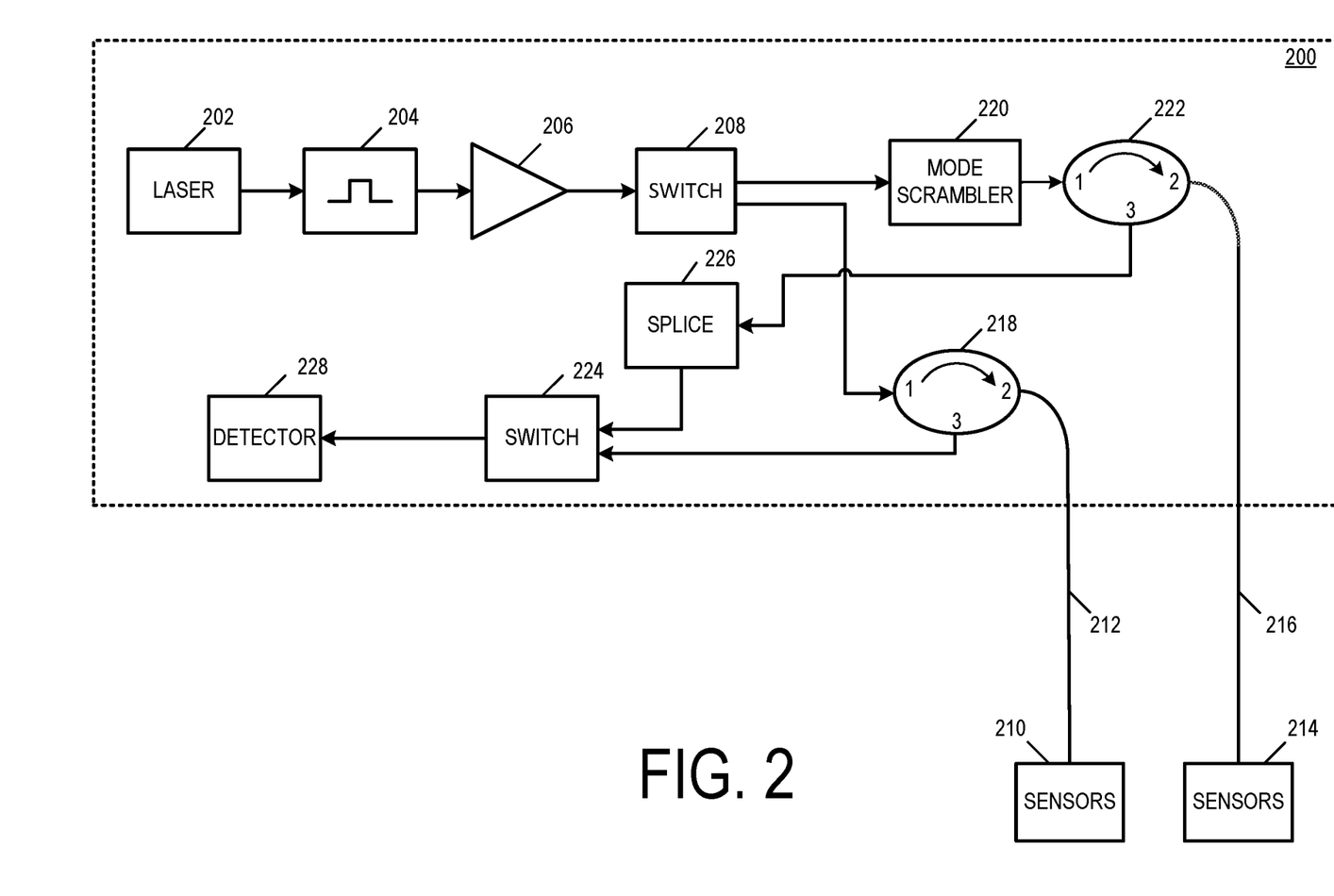
FIG. 2 is a schematic diagram of an example of a distributed acoustic sensing system according to one aspect of the present disclosure.

FIG. 2 is a schematic diagram of an example of a distributed acoustic sensing system according to one aspect of the present disclosure. The distributed acoustic sensing system includes an interrogation system 200. In some aspects, the interrogation system 200 of FIG. 2 represents one configuration of the interrogation subsystem 118 and the optical fiber cables 114 of FIG. 1, but other configurations are possible. For example, the components of the distributed acoustic sensing system may be arranged in a different order or configuration without departing from the scope of the present disclosure. Similarly, one or more components may be added to or subtracted from the configuration of the distributed acoustic sensing system shown in FIG. 2 without departing from the scope of the present disclosure.

The interrogation system 200 may be positioned at a surface of a wellbore (e.g., wellbore 104) and includes a light source 202, a pulse generator 204, and an amplifier 206. In some aspects, the light source 202 includes a laser device, light-emitting diode, or other optical transmitter for generating and emitting light signals. In some aspects, the pulse generator 204 and the amplifier 206 may manipulate or modulate the light signals emitted from the light source 202. For example, the pulse generator 204 may include an opto-electrical device acting as a high-speed shutter or optical switch to generate short pulses (e.g., 200 nanoseconds or less) of light using the light emitted by the light source 202. In some aspects, the pulse generator 204 may include one or more amplifiers, oscillators, or other suitable components to manipulate the light received from the light source 202 and to generate light pulses at a controlled time duration. For, example, the pulse may be a short pulse of the light signal having a time duration of less than one microsecond based on the configuration and operation of the distributed acoustic sensing system.

The pulses of the light signals from the pulse generator 204 may be outputted to the amplifier 206. The amplifier 206 may receive a pulse of a light signal from the pulse generator 204 and amplify, or intensify, the pulse of the light signal. In some aspects, the amplifier 206 includes an optical amplifier, such as an erbium-doped fiber amplifier ("EDFA") that may amplify a received light signal without first converting the optical signal to an electrical signal. For example, an EDFA may include a core of a silica fiber that is doped with erbium ions to cause the wavelength of a received light signal to experience a gain to amplify the intensity of an outputted light signal. Although only one amplifier 206 is shown in FIG. 2, the amplifier 206 may represent multiple amplifiers without departing from the scope of the present disclosure. Also, in some aspects, the pulse generator 204 and amplifier 206, or their functions, may be combined into a single device or integrated with the light source 202 without departing from the scope of the present disclosure.

The light source 202, the pulse generator 204, and the amplifier 206, collectively, provide a light signal to a switch 208. In some aspects, the switch 208 is an optical switch including circuitry to selectively route the light signal from the amplifier 206 to one or more sensors 210 coupled to a single-mode optical fiber cable 212 or one or more sensors 214 coupled to a multi-mode optical fiber cable 216. In some aspects, the sensors 210, 214 may be positioned in a wellbore (e.g., wellbore 104 of FIG. 1) to sense characteristics downhole in the wellbore. The switch 208 may include at least one port for receiving the light signal from the amplifier 206 and at least two ports for routing the light signal received from the amplifier 206 to the sensors 210 or the sensors 214. In some aspects, the switch 208 is a unidirectional switch configured to route light signals in a single direction (e.g., from an input port to an output port). For example, the direction in which the switch 208 routes light signals may be independent of its position in an optical path. In other aspects, the switch 208 may be a bi-directional switch capable of routing light signals in either direction (e.g., one or more ports operating as both an input port and an output port to light signals). For example, the direction in which the switch 208 routes light signals may be dependent on its position in an optical path (e.g., the switch 208 being positioned at the output of a device versus the switch 208 being positioned at an input of the device).

The switch 208 may also be optically transparent. For example, the switch 208 may operate in a passband wavelength range to allow light signals to be routed through the switch 208 without being scattered, in an optically transparent manner. In additional and alternative aspects, the switch 208 may be a passive optical switch. For example, the switch 208 may not include any gain elements between the input and the output of the switch 208.

A circulator 218 is positioned at an output of the switch 208. The circulator 218 can be a single-mode optical, three-port circulator including ports 1-3. The circulator 218 may include one or more isolation components to isolate the input of the light signals at each of the ports 1-3. Port 1 is coupled to the output of the switch 208 to receive the light signals routed by the switch 208 to a single-mode configuration. The single-mode configuration includes the sensors 210 and the single-mode optical fiber cable 212. The single-mode optical fiber cable 212 includes one or more optical fiber cables that propagate, or carry, light signals in a direction that is parallel to the fiber (e.g., a traverse mode). In some aspects, the single-mode optical fiber cable 212 may route light signals having a wavelength of 1310 nanometers or 1550 nanometers. In additional and alternative aspects, the single-mode optical fiber cable 212 may include a core diameter between 8 and 10 microns.

The circulator 218 may route the light signals from port 1 to port 2. Port 2 is coupled to the single-mode optical fiber cable 212. The light signals may be output from port 2 to the single-mode optical fiber cable 212 to interrogate the sensors 210 coupled to the single-mode optical fiber cable 212. In some aspects, the sensors 210 may be embedded, or inscribed, in the single-mode optical fiber cable 212 (e.g., single-mode fiber Bragg grating). Port 2 may receive reflected light signals. The reflected light signals may correspond to reflections of the light signals transmitted to the sensors 210 from port 2. For example, the light signals may be routed by the single-mode optical fiber cable 212 to the sensors 210 and reflected back through the single-mode optical fiber cable 212 to port 2. Port 2 may route the reflected light signals to port 3. The unilateral nature of the circulator 218 may prevent the reflected light from the sensors 210 from reflecting back toward the switch 208

A mode scrambler 220 is positioned at a second output of the switch 208. The mode scrambler 220 may receive light signals routed by the switch toward the sensors 214 coupled to the multi-mode optical fiber cable 216. The mode scrambler 220 may include a device that includes a mode mixer for providing a modal distribution of light signals. For example, the mode scrambler 220 may receive a light signal from the switch 208 and generate multiple modes, or patterns, of the light signals. Each mode of the light signal may propagate an optical path in a different direction. The distributed light signal may be output by the mode scrambler 220 to a circulator 222.

In some aspects, the circulator 222 is a multi-mode optical circulator. Similar to the circulator 218, the circulator 222 includes three ports, ports 1-3, and one or more isolation components to isolate the input of the light signals at each of the ports 1-3. Port 1 is coupled to the output of the switch 208 to receive the light signals routed by the switch 208 to a multi-mode configuration. The multi-mode configuration includes the sensors 214 and the multi-mode optical fiber cable 216. The multi-mode optical fiber cable includes one or more optical fiber cables that propagate light in more than one direction, or mode. In some aspects, the multi-mode optical fiber cable 216 may route light signals having a wavelength of 850 nanometers or 1300 nanometers. In additional and alternative aspects, the core diameter of the multi-mode optical fiber cable 216 may be larger than the core diameter of the single-mode optical fiber cable 212 (e.g., 50-100 microns). The larger core diameter may allow the multi-mode optical fiber cable 216 to support the multiple propagation modes.

The circulator 222 may route the light signals from port 1 to port 2. Port 2 is coupled to the multi-mode optical fiber cable 216. The light signals may be output from port 2 to the multi-mode optical fiber cable 216 to interrogate the sensors 214 coupled to the multi-mode optical fiber cable 216. In some aspects, the sensors 210 may be embedded, or inscribed in the multi-mode optical fiber cable 216 (e.g., multi-mode fiber Bragg grating). Reflected light signals corresponding to reflections of the light signals transmitted to the sensors 214 from port 2 may be received at port 2 and routed to port 3. The unilateral nature of the circulator 222 may prevent the reflected light from the sensors 214 from reflecting back toward the switch 208.

Port 3 of the circulators 218, 222 are coupled to a switch 224. Port 3 of the circulator 218 is coupled directly to the switch 224. Port 3 of the circulator 222 is coupled to the switch 224 via a splice 226. In some aspects, the splice 226 is a fusion splice joining the fibers carrying the reflection signals corresponding to each of the respective modes of the light signal. The switch 224 may receive reflected light signals from port 3 of the circulator 218 or port 3 of the circulator 222. The switch 224 includes at least two ports for receiving the reflected light signals routed by the single-mode optical fiber cable 212 or the multi-mode optical fiber cable 216. The switch 224 also includes at least one port for routing the reflected light signals to a detector 228 for analysis. In some aspects, the switch 224 is a unidirectional switch configured to route light signals in a single direction (e.g., from an input port to an output port). In other aspects, the switch 224 may be a bi-directional switch capable of routing light signals in either direction. In such aspects, the switch 224 may be similar or identical in type to the switch 208. For example, the switches 208, 224 may each include three ports. The switch 208 may operate in a first direction from one port operating as an input port to one of two ports operating as output ports. The switch 224 may operate in a second, opposing direction from two ports operating as input ports to one port operating as an output port. Similar to the switch 208, the switch 224 may be optically transparent and passive.

In some aspects, the detector 228 may include an optical receiver an opto-electrical devices having one or more photodetectors to convert light signals into electricity using a photoelectric effect. In some aspects, the photodetectors include photodiodes to absorb photons of the light signals and convert the light signals into an electrical current. In some aspects, the electrical current may be routed to a computing device for analyzing the light signals to determine a condition of the wellbore. Although one detector 228 is shown in FIG. 2, the detector 228 may represent a single optical receiver or multiple optical receivers for receiving light signals reflected from the sensors 210, 214.

Figure 3:
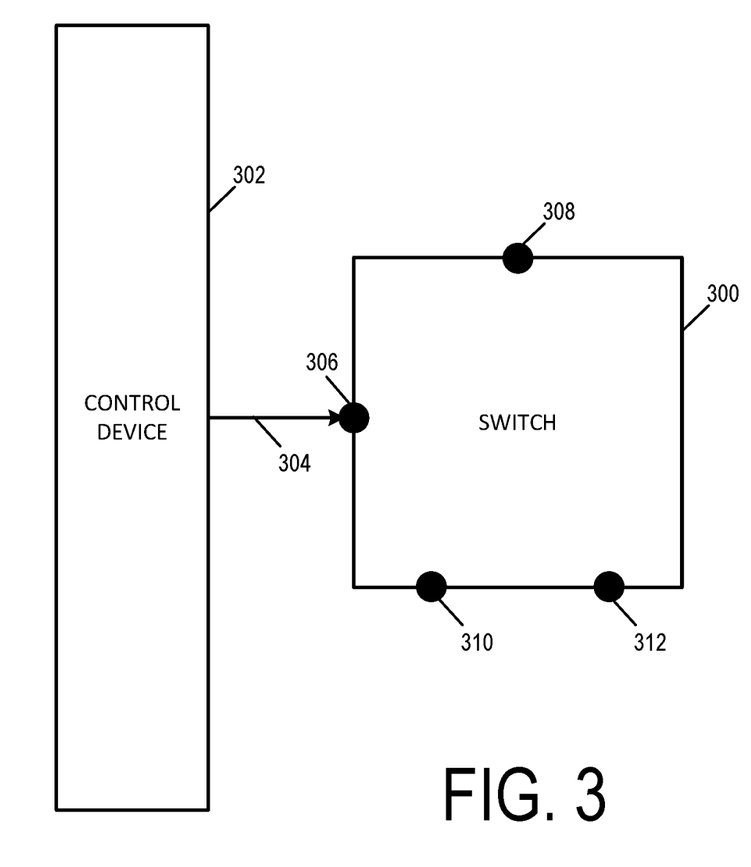
FIG. 3 is a block diagram of an example of the switches of FIG. 2 according to one aspect of the present disclosure.

FIG. 3 is a block diagram of an example of a switch 300 that may be included in the interrogation system 200 of FIG. 2 according to one aspect of the present disclosure. In some aspects, the switch 300 may represent the switches 208, 224 of FIG. 2. The switch 300 is communicatively coupled to a control device 302 by a communication line 304. The control device 302 may include an electrical or optical device for controlling the operation of the switch 300. In some aspects, the communication line 304 may correspond to an electrical line connection (e.g., conductive wire) or an optical connection (e.g., optical fiber cable) connected to a control port 306 of the switch 300. In additional and alternative aspects, the control device 302 may be wirelessly connected to the switch 300 for controlling the operation of the switch 300. In further aspects, the control device 302 may also be connected other components of the interrogation system 200 of FIG. 2 without departing from the scope of the present disclosure.

The switch 300 is an optical switch that includes ports 308, 310, 312. In some aspects, the switch 300 may be connected to three optical paths at ports 308, 310, 312, respectively. Depending on the installation of the switch in a distributed acoustic sensing system, the ports 308, 310, 312 may represent input ports for receiving a light signal or output ports for routing, or outputting, the light signal. For example, the port 308 may operate as an input for receiving a light signal and may output the light signal to a path connected to one of ports 310, 312. In another aspect, ports 310, 312 may operate as an input for receiving a light signal and may output the light signal to a path connected to port 308. In some aspects, the control device 302 may actuate the switch 300 to determine a port path for routing light signals through the switch 300. The port path may at least two of the ports 308, 310, 312 determined by the control device 302. In one example, control device 302 may transmit a control signal to the switch 300 to cause the switch 300 to route light signals from port 308 to port 310. The control device 302 may transmit a second control signal to the switch 300 to route light signals from port 308 to port 312. In another example, control device may transmit a control signal to the switch 300 to cause the switch 300 to route light signals from port 310 to port 308. The control device may transmit a second control signal to the switch 300 to cause the switch to route light signals from port 312 to 308.

Although the control device 302 is shown as separate from the switch 300 in FIG. 3, the functions of the control device 302 may be included in additional circuitry of the switch 300 without departing from the scope of the present disclosure. In one non-limiting example, the additional control circuitry may include a timer or other means for switching the port path of the switch 300 at predetermined intervals. In another non-limiting example, the additional control circuitry may include a processing device or other means for determining the port path based on the light signal received by the switch 300. For example, the additional control circuitry may cause the switch 300 to change the route path depending on the wavelength of the light signal received. The wavelength may correspond to a suitable wavelength for one of the single-mode configuration or the multi-mode configuration and may route the light signal to the appropriate configuration upon identifying the wavelength associated with the light signal.

Figure 4:
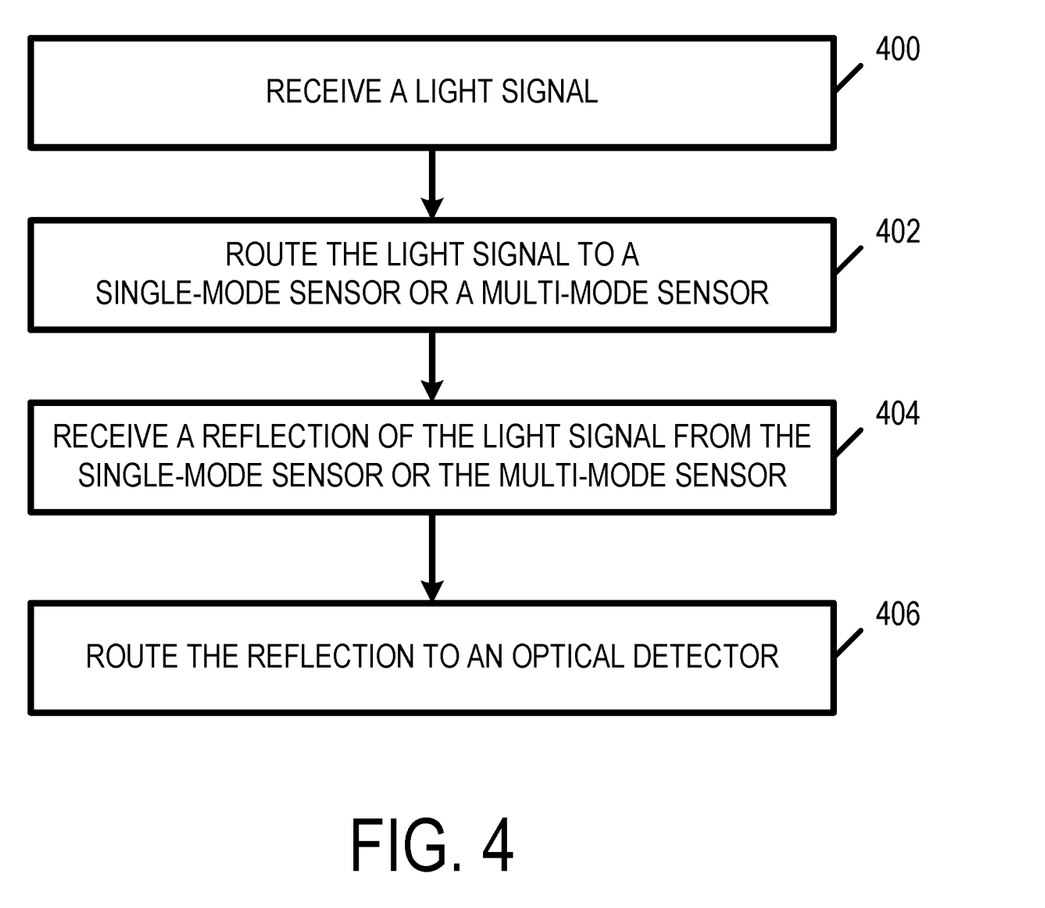
FIG. 4 is a flow chart of a process for interrogating a light signal using the distributed acoustic sensing system according to one aspect of the present disclosure.

FIG. 4 is a flow chart of a process for interrogating a light signal using the distributed acoustic sensing system according to one aspect of the present disclosure. The process is described with respect to the wellbore environment 100 of FIG. 1 and the distributed acoustic sensing system of FIG. 2, unless otherwise specified, though other implementations are possible without departing form the scope of the present disclosure.

In block 400, a light signal is received. In some aspects, the light signal is received by the switch 208 from the light source 202. For example, the light signal may be generated by the light source 202 and routed through the pulse generator 204 and the amplifier 206 to the switch 208.

In block 402, the light signal is routed to a single-mode sensor or a multi-mode sensor. For example, the switch 208 may route the light signal to the sensors 210 coupled to the single-mode optical fiber cable 212 through the circulator 218 and the single-mode optical fiber cable 212. In another example, the switch 208 may route the light signal to the sensors 214 coupled to the multi-mode optical fiber cable 216 through the mode scrambler 220, the circulator 222, and the multi-mode optical fiber cable 216.

In block 404, a reflection of the light signal is received. In some aspects, the reflection is received by the switch 224. The reflection may be generated by the sensors 210 or the sensors 214 in response to receiving the light signal as described in block 402. The reflection may include a reflected light signal routed from the sensors 210 or the sensors 214 through the single-mode optical fiber cable 212 or the multi-mode optical fiber cable 216, respectively. The reflection may be routed through the circulator 218 or the circulator 222 to the switch 224.

In block 406, the reflection is routed to the optical detector 228. In some aspects, the reflection is routed to the optical detector 228 by the switch 224. For example, the switch 224 may receive the reflection from the single-mode configuration or the multi-mode configuration and route the reflection to the detector 228.

Figure 5:
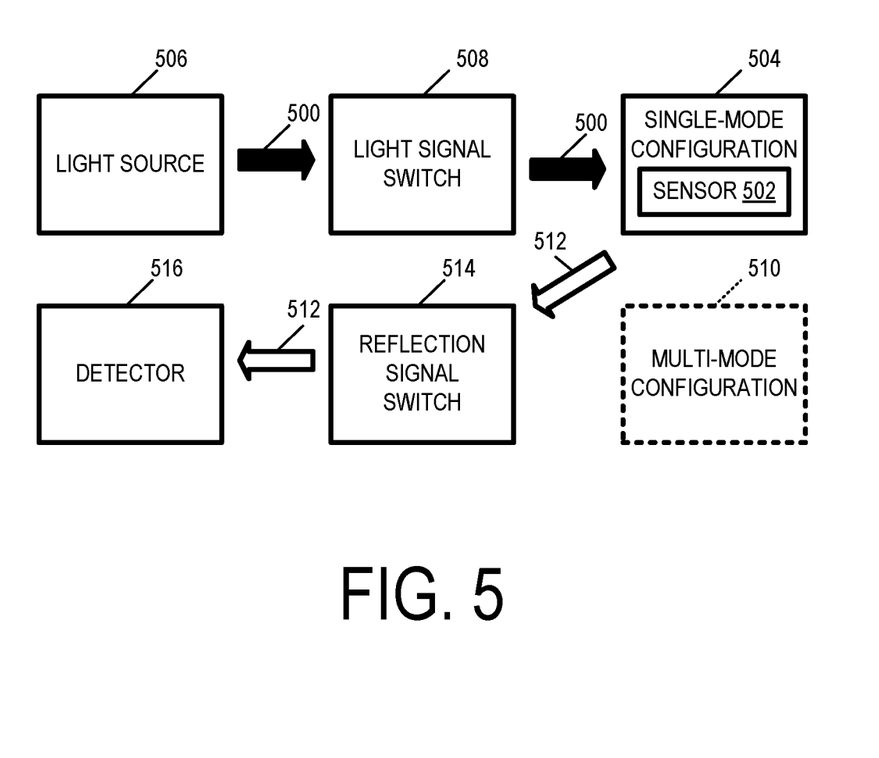
FIG. 5 is a data flow diagram of a light signal interrogating a single-mode sensor of a distributed acoustic sensing system according to one aspect of the present disclosure.
Figure 6:
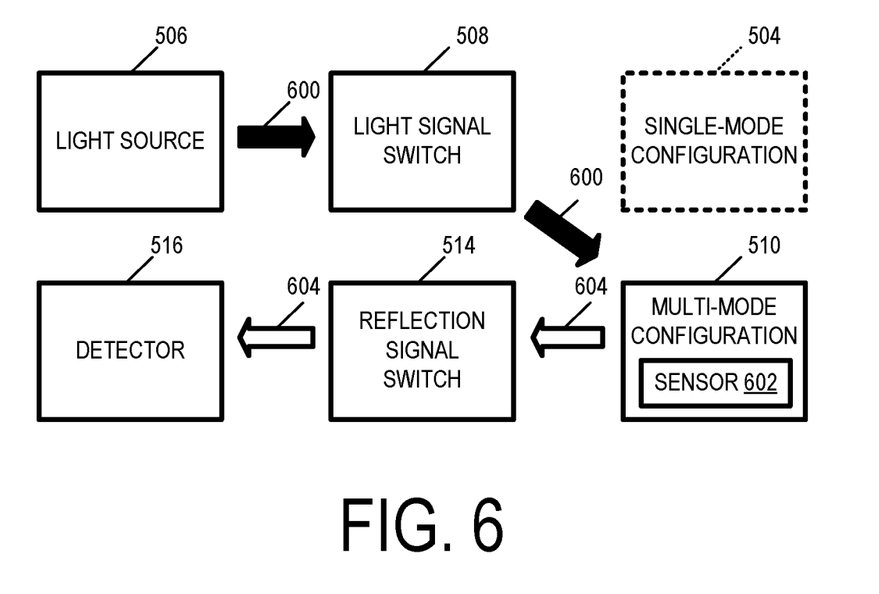
FIG. 6 is a data flow diagram of a light signal interrogating a multi-mode sensor of the distributed acoustic sensing system of FIG. 5 according to one aspect of the present disclosure.

FIGS. 5 and 6 show a flow of light signals between a light source and a detector of a distributed acoustic sensing system during single-mode operation and multi-mode operation, respectively. In some aspects, FIGS. 5 and 6 illustrate the process described in FIG. 4.

FIG. 5 is a data flow diagram of a light signal 500 interrogating a sensor 502 in a single-mode configuration 504 of a distributed acoustic sensing system according to one aspect of the present disclosure. In some aspects, the single-mode configuration may correspond to one or more of the circulator 218, the single-mode optical fiber cable 212, and the sensors 210 of FIG. 2. The sensor 502 represents a single-mode sensor coupled to a single-mode optical fiber cable. For example, the sensor 502 may correspond to one of the sensors 210 of FIG. 2. The light signal 500 may be generated by a light source 506. The light signal 500 is transmitted from the light source 506 to a light signal switch 508 that is coupled to the single-mode configuration 504 and a multi-mode configuration 510. The light signal switch 508 may be configured to route the light signal 500 from the light source 506 through the light signal switch 508 to the sensor 502.

In some aspects, the sensor 502 may generate a reflection signal 512. The reflection signal 512 may be routed from the sensor 502 to a reflection signal switch 514 that is coupled to a detector 516. In some aspects, the reflection signal switch 514 and the detector 516 correspond to the switch 224 and the detector 228 of FIG. 2, respectively. The reflection signal switch 514 may be configured to route the reflection signal 512 from the sensor 502 through the reflection signal switch 514 to the detector 516. In FIG. 5, the configuration of the light signal switch 508 causes the distributed acoustic sensing system to operate in a single-mode operation by routing the light signal 500 to the single-mode configuration 504, bypassing the multi-mode configuration 510.

FIG. 6 is a data flow diagram of a light signal 600 interrogating a multi-mode sensor 602 of the multi-mode configuration 510 of FIG. 5 according to one aspect of the present disclosure. In some aspects, the multi-mode configuration may correspond to one or more of the circulator 222, the multi-mode optical fiber cable 216, and the sensors 214 of FIG. 2. The sensor 602 represents a multi-mode sensor coupled to a multi-mode optical fiber cable. For example, the sensor 602 may correspond to one of the sensors 214 of FIG. 2. The light signal 600 may be generated by the light source 506. The light signal 600 is transmitted from the light source 506 to a light signal switch 508. The light signal switch 508 may now be configured to route the light signal 600 from the light source 506 through the light signal switch 508 to the sensor 602 of the multi-mode configuration 510.

In some aspects, the sensor 602 may generate a reflection signal 604. The reflection signal 604 may be routed from the sensor 502 to the reflection signal switch 514. The reflection signal switch 514 may be configured to route the reflection signal 604 from the sensor 602 through the reflection signal switch 514 to the detector 516. In FIG. 6, the configuration of the light signal switch 508 causes the distributed acoustic sensing system to operate in a multi-mode operation by routing the light signal 600 to the multi-mode configuration 510, bypassing the single-mode configuration 504.

In some aspects, systems and methods may be provided according to one or more of the following examples:

Example 1

An interrogation system may include a light signal switch that can communicatively couple to an optical light source to route, in a downhole direction in a wellbore through a single-mode optical fiber cable and a multi-model optical fiber cable as selected by the light signal switch, light signals generated by the light source. The interrogation system may also include a reflection signal switch that can communicatively couple to the single-mode optical fiber cable and the multi-mode optical fiber cable to route reflections of the light signals from the signal-mode optical fiber cable and the multi-mode optical fiber cable to an optical detector.

Example 2

The interrogation system of example 1 may also include a circulator device positioned between the light signal switch and the multi-mode optical fiber cable. The circulator device may include ports for routing the light signals toward the multi-mode optical fiber cable and routing the reflection of the light signals from the multi-mode optical fiber cable to the reflection signal switch.

Example 3

The interrogation system of examples 1-2 may also include a mode scrambler device positioned between the light signal switch and the circulator device to route the light signals from the light signal switch to a first port of the circulator device.

Example 4

The interrogation system of examples 1-3 may also include a circulator device positioned between the light signal switch and the single-mode optical fiber cable. The circulator device may include three ports for routing the light signals toward the single-mode optical fiber cable and routing the reflection of the light signals from the multi-mode optical fiber cable to the reflection signal switch.

Example 5

The interrogation system of examples 1-4 may also include a pulse generator and an amplifier positioned between the light source and the light signal switch.

Example 6

The interrogation system of examples 1-5 may feature the amplifier being an erbium doped fiber amplifier positioned between the pulse generator and the light signal switch to amplify pulses of the light signals generated by the pulse generator and to transmit the pulses to the light signal switch.

Example 7

The interrogation system of examples 1-6 may feature the light signal switch including a single input port for receiving the light signals and two output ports communicatively coupled to the single-mode optical fiber cable and the multi-mode optical fiber cable. The interrogation system may also feature the reflection signal switch including two input ports communicatively coupled to the single-mode optical fiber cable and the multi-mode optical fiber cable and a single output port for routing the reflections of the light signals to the optical detector.

Example 8

The interrogation system of examples 1-7 may also include a plurality of sensors communicatively coupled to the single-mode optical fiber cable and the multi-mode optical fiber cable. The plurality of sensors may include at least a first sensor coupled to the single-mode optical fiber cable and a second sensor coupled to the multi-mode optical fiber cable.

Example 9

A method may include receiving, by a light signal switch communicatively coupled to a single-mode sensor fiber and a multi-mode optical fiber positioned in a wellbore, a light signal. The method may also include routing, by the light signal switch, the light signal to a single-mode sensor through the single-mode optical fiber cable or a multi-mode sensor through the multi-mode optical fiber cable. The method may also include receiving, by a reflection signal switch communicatively coupled to the single-mode optical fiber and the multi-mode optical fiber, a reflection signal corresponding to the light signal from the single-mode sensor or the multi-mode sensor. The method may also include routing, by the reflection signal switch, the reflection signal to an optical detector.

Example 10

The method of example 9 may feature the light signal switch including a single input port and two output ports. The two output ports may include a first output port communicatively coupled to the single-mode optical fiber cable and a second output port communicatively coupled to the multi-mode optical fiber cable. The method may also feature receiving the light signal to include receiving the light signal at the single input port. The method may also feature routing the light signal to the single-mode sensor or the multi-mode sensor to include routing the light signal from the first output port to the single-mode optical fiber cable or routing the light signal from the second output port to the multi-mode optical fiber cable.

Example 11

The method of examples 9-10 may feature the reflection signal switch including two input ports and a single output port. The two input ports may include a first input port communicatively coupled to the single-mode optical fiber cable and a second input port communicatively coupled to the multi-mode optical fiber cable. The single output port may be communicatively coupled to the optical detector. The method may also feature receiving the reflection signal to include receiving the reflection signal at the first input port or the second input port. The method may also feature routing the reflection signal to the optical detector to include routing the reflection signal from the single output port to the optical detector.

Example 12

The method of examples 9-11 may feature routing the light signal to the single-mode sensor or the multi-mode sensor to include routing the light signal to a circulator device communicatively coupled to the single-mode optical fiber cable or the multi-mode optical fiber cable. The circulator device may include a first port communicatively coupled to the light signal switch, a second port communicatively coupled to the single-mode optical fiber cable or the multi-mode optical fiber cable, and a third port communicatively coupled to the reflection signal switch.

Example 13

The method of examples 9-12 may feature the routing the light signal to the multi-mode sensor including routing the light signal to a mode scrambler device communicatively coupled to the circulator device.

Example 14

The method of examples 9-13 may feature the light signal switch being communicatively coupled to a first circulator device and a second circulator device, the first circulator device communicatively coupled to the single-mode sensor and the second circulator device communicatively coupled to the multi-mode sensor. The method may also feature routing the light signal to the single-mode sensor or the multi-mode sensor to include routing the light signal to the first circulator device or the second circulator device. The method may also feature the first circulator device and the second circulator device being three-port circulators and include a respective port that is communicatively coupled to the reflection signal switch.

Example 15

The method of examples 9-14 may feature receiving the light signal to include receiving the light signal from an output of an amplifier communicatively coupled to the light signal switch. The method may also feature the light signal including at least one pulse of light generated by a pulse generator positioned between a light source and an input of the amplifier.

Example 16

The method of examples 9-15 may feature routing the light signal to the single-mode sensor to include receiving, by the light signal switch, a first control signal corresponding to a first command to output received light signals to a first output port of the light signal switch that is communicatively coupled to the single-mode optical fiber cable. The method may also feature routing the light signal to the single-mode sensor to include routing the light signal to the single-mode sensor subsequent to receiving the first control signal. The method may also feature routing the light signal to the multi-mode sensor to include receiving, by the light signal switch, a second control signal corresponding to a second command to output the received light signals to a second output port of the light signal switch that is communicatively coupled to the multi-mode optical fiber cable. The method may also feature routing the light signal to the multi-mode sensor to include routing the light signal to the multi-mode sensor subsequent to receiving the second control signal.

Example 17

A distributed acoustic sensing system may include a plurality of optical fiber cables positionable in a wellbore to transmit light signals to a plurality of wellbore sensors associated with the plurality of optical fibers. The plurality of optical fibers may include a multi-mode optical fiber cable to transmit the light signals to a first sensor of the plurality of wellbore sensors. The plurality of optical fibers may also include a single-mode optical fiber cable to transmit the light signals to a second sensor of the plurality of wellbore sensors. The distributed acoustic sensing system may also include an optical switch positionable between a common light source and the plurality of optical fibers to route the light signals from the common light source to at least one optical fiber of the plurality of optical fibers to interrogate at least one wellbore sensor of the plurality of wellbore sensors.

Example 18

The distributed acoustic sensing system of example 17 may also include three-port circulator devices positionable between the optical switch and the plurality of wellbore sensors. The three-port circulator devices may include a first circulator device communicatively coupled to the single-mode optical fiber cable and a second circulator device communicatively coupled to the multi-mode optical fiber cable.

Example 19

The distributed acoustic sensing system of examples 17-18 may also include a second optical switch positionable between the three-port circulator devices and an optical detector to route reflection signals from the single-mode optical fiber cable or the multi-mode optical fiber cable to the optical detector. The reflection signals may be generated by the at least one wellbore sensor and corresponding to reflections of the light signals.

Example 20

The distributed acoustic sensing system of examples 17-19 may also include a mode scrambler device positioned between the optical switch and the multi-mode optical fiber cable to distribute the light signals into multiple modes and route the multiple modes of the light signals to the multi-mode optical fiber cable.

The foregoing description of the examples, including illustrated examples, has been presented only for the purpose of illustration and description and is not intended to be exhaustive or to limit the subject matter to the precise forms disclosed. Numerous modifications, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. An interrogation system, comprising:
    a light signal switch communicatively couplable to an optical light source to route, in a downhole direction in a wellbore through a single-mode optical fiber cable and a multi-mode optical fiber cable as selected by a control device communicatively couplable to the light signal switch, light signals generated by the optical light source, the light signal switch comprising:
        an input port for receiving the light signals;
        a first output port communicatively coupled to the single-mode optical fiber cable; and a second output port communicatively coupled to the multi-mode optical fiber cable; and
a reflection signal switch communicatively couplable to the single-mode optical fiber cable and the multi-mode optical fiber cable to route reflections of the light signals from the single-mode optical fiber cable and the multi-mode optical fiber cable to an optical detector, the reflection signal switch comprising:
a first input port communicatively coupled to the single-mode optical fiber cable;
a second input port communicatively coupled to the multi-mode optical fiber cable; and
an output port for routing the reflections of the light signals to the optical detector.

2. The interrogation system of claim 1, further comprising a circulator device positioned between the light signal switch and the multi-mode optical fiber cable, the circulator device including ports for routing the light signals toward the multi-mode optical fiber cable and routing the reflections of the light signals from the multi-mode optical fiber cable to the reflection signal switch.

3. The interrogation system of claim 2, further comprising a mode scrambler device, for providing, using a mode mixer, a modal distribution of light signals that are propagatable in a plurality of directions, positioned between the light signal switch and the circulator device to route the light signals from the light signal switch to a first port of the circulator device.

4. The interrogation system of claim 1, further comprising a circulator device positioned between the light signal switch and the single-mode optical fiber cable, the circulator device including three ports for routing the light signals toward the single-mode optical fiber cable and routing the reflections of the light signals from the multi-mode optical fiber cable to the reflection signal switch.

5. The interrogation system of claim 1, further comprising a pulse generator and an amplifier positioned between the optical light source and the light signal switch.

6. The interrogation system of claim 5, wherein the amplifier is an erbium doped fiber amplifier positioned between the pulse generator and the light signal switch to amplify pulses of the light signals generated by the pulse generator and to transmit the pulses to the light signal switch.

7. The interrogation system of claim 1, further including:
a plurality of sensors communicatively coupled to the single-mode optical fiber cable and the multi-mode optical fiber cable, the plurality of sensors including at least a first sensor coupled to the single-mode optical fiber cable and a second sensor coupled to the multi-mode optical fiber cable.

8. A method, comprising:
receiving, by an input port of a light signal switch communicatively coupled to a single-mode optical fiber cable and a multi-mode optical fiber cable positioned in a wellbore, a light signal;
routing, by a control device communicatively coupled to the light signal switch, the light signal to a single-mode sensor through the single-mode optical fiber cable using a first output port, of the light signal switch, that is communicatively coupled to the single-mode optical fiber cable or to a multi-mode sensor through the multi-mode optical fiber cable using a second output port, of the light signal switch, that is communicatively coupled to the multi-mode optical fiber cable;
receiving, by a first input port, of a reflection signal switch, that is communicatively coupled to the single-mode optical fiber cable and by a second input port, of the reflection signal switch, that is communicatively coupled to the multi-mode optical fiber cable, a reflection signal corresponding to the light signal from the single-mode sensor or the multi-mode sensor; and
routing, by an output port of the reflection signal switch, the reflection signal to an optical detector.

9. The method of claim 8, wherein routing the light signal to the single-mode sensor or the multi-mode sensor includes routing the light signal to a circulator device communicatively coupled to the single-mode optical fiber cable or the multi-mode optical fiber cable, the circulator device including a first port communicatively coupled to the light signal switch, a second port communicatively coupled to the single-mode optical fiber cable or the multi-mode optical fiber cable, and a third port communicatively coupled to the reflection signal switch.

10. The method of claim 9, wherein routing the light signal to the multi-mode sensor includes routing the light signal to a mode scrambler device communicatively coupled to the circulator device.

11. The method of claim 8, wherein the light signal switch is communicatively coupled to a first circulator device and a second circulator device, the first circulator device communicatively coupled to the single-mode sensor and the second circulator device communicatively coupled to the multi-mode sensor,
wherein routing the light signal to the single-mode sensor or the multi-mode sensor includes routing the light signal to the first circulator device or the second circulator device,
wherein the first circulator device and the second circulator device are three-port circulators and include a respective port that is communicatively coupled to the reflection signal switch.

12. The method of claim 8, wherein receiving the light signal includes receiving the light signal from an output of an amplifier communicatively coupled to the light signal switch,
wherein the light signal includes at least one pulse of light generated by a pulse generator positioned between a light source and an input of the amplifier.

13. The method of claim 8,
wherein routing the light signal to the single-mode sensor includes:
receiving, by the light signal switch, a first control signal corresponding to a first command from the control device to output received light signals to the first output port of the light signal switch; and
routing the light signal to the single-mode sensor subsequent to receiving the first control signal,
wherein routing the light signal to the multi-mode sensor includes:
receiving, by the light signal switch, a second control signal corresponding to a second command from the control device to output the received light signals to the second output port of the light signal switch; and
routing the light signal to the multi-mode sensor subsequent to receiving the second control signal.

14. A distributed acoustic sensing system, comprising:
a plurality of optical fiber cables positionable in a wellbore to transmit light signals to a plurality of wellbore sensors associated with the plurality of optical fiber cables, the plurality of optical fiber cables including:
a multi-mode optical fiber cable to transmit the light signals to a first sensor of the plurality of wellbore sensors; and a single-mode optical fiber cable to transmit the light signals to a second sensor of the plurality of wellbore sensors; and an optical switch positionable between a common light source and the plurality of optical fiber cables, the optical switch switchable between single-mode and multi-mode using a control device communicatively couplable to the optical switch to route the light signals from the common light source to at least one optical fiber of the plurality of optical fiber cables to interrogate at least one wellbore sensor of the plurality of wellbore sensors, the optical switch comprising:

an input port for receiving the light signals;

a first output port communicatively coupled to the single-mode optical fiber cable; and a second output port communicatively coupled to the multi-mode optical fiber cable.

15. The distributed acoustic sensing system of claim 14, further comprising three-port circulator devices positionable between the optical switch and the plurality of wellbore sensors, the three-port circulator devices including a first circulator device communicatively coupled to the single-mode optical fiber cable and a second circulator device communicatively coupled to the multi-mode optical fiber cable.

16. The distributed acoustic sensing system of claim 15, further comprising a second optical switch positionable between the three-port circulator devices and an optical detector to route reflection signals from the single-mode optical fiber cable or the multi-mode optical fiber cable to the optical detector, the reflection signals being generated by the at least one wellbore sensor and corresponding to reflections of the light signals, the second optical switch comprising:

a first input port for receiving the reflection signals from the single-mode optical fiber cable;

a second input port for receiving the reflection signals from the multi-mode optical fiber cable; and an output port for routing the reflection signals to the optical detector.

17. The distributed acoustic sensing system of claim 14, further comprising: a mode scrambler device positioned between the optical switch and the multi-mode optical fiber cable to distribute the light signals into multiple modes and route the multiple modes of the light signals to the multi-mode optical fiber cable.

* * * * *